US012807132B2

(12) United States Patent
Woo et al.

(10) Patent No.: US 12,807,132 B2
(45) Date of Patent: Nov. 24, 2026

(54) VEHICLE DRIVING ASSISTANCE CONTROL METHOD AND SYSTEM

(71) Applicants: HYUNDAI MOTOR COMPANY, Seoul (KR); KIA CORPORATION, Seoul (KR)

(72) Inventors: Dong Hyeon Woo, Hwaseong-si (KR); Jin Kyeom Cho, Hwaseong-si (KR); Sun Woo Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 30 days.

(21) Appl. No.: 18/944,809

(22) Filed: Nov. 12, 2024

(65) Prior Publication Data

US 2025/0381950 A1 Dec. 18, 2025

(30) Foreign Application Priority Data

Jun. 12, 2024 (KR) ........................ 10-2024-0076468

(51) Int. Cl.
*B60W 30/02* (2012.01)
*B60W 10/20* (2006.01)
*B60W 30/18* (2012.01)

(52) U.S. Cl.
CPC ............ *B60W 30/02* (2013.01); *B60W 10/20* (2013.01); *B60W 30/18163* (2013.01); *B60W 2530/10* (2013.01); *B60W 2552/10* (2020.02); *B60W 2552/30* (2020.02); *B60W 2554/4041* (2020.02); *B60W 2555/20* (2020.02); *B60W 2710/20* (2013.01); *B60W 2720/10* (2013.01)

(58) Field of Classification Search
CPC ............. B60W 30/02; B60W 2555/20; B60W 30/18163
See application file for complete search history.

(56) References Cited

U.S. PATENT DOCUMENTS

| | | | | |
|---|---|---|---|---|
| 9,132,835 | B2 * | 9/2015 | Yang | B60W 10/22 |
| 11,628,863 | B1 * | 4/2023 | Huang | B60W 60/0023 701/24 |
| 2014/0371948 | A1 * | 12/2014 | Yang | B60W 40/02 701/1 |
| 2015/0039183 | A1 * | 2/2015 | Yang | B60W 10/22 701/42 |
| 2016/0096546 | A1 * | 4/2016 | Chia | B62D 5/0466 701/41 |
| 2022/0169254 | A1 * | 6/2022 | Strobel | B60G 1/04 |
| 2022/0266852 | A1 * | 8/2022 | Khayyer | B60W 40/08 |
| 2024/0425045 | A1 * | 12/2024 | Onishi | B60W 50/023 |

FOREIGN PATENT DOCUMENTS

KR 2021-0065234 A 6/2021

* cited by examiner

*Primary Examiner* — Long T Tran
(74) *Attorney, Agent, or Firm* — Lempia Summerfield Katz LLC

(57) ABSTRACT

A vehicle driving assistance control method includes determining a crosswind force acting on a host vehicle in a direction crossing the direction of travel of the host vehicle based on the steering angle and acceleration of the host vehicle, and controlling, upon detecting at least one other vehicle within a predetermined distance from the host vehicle and the magnitude of the determined crosswind force being greater than a predetermined first threshold value, the driving of the host vehicle based on the direction of the determined crosswind force and the position of the at least one detected other vehicle.

20 Claims, 6 Drawing Sheets

VEHICLE DRIVING ASSISTANCE CONTROL METHOD AND SYSTEM

CROSS REFERENCE TO RELATED APPLICATIONS

The present application claims priority to Korean Patent Application No. 10-2024-0076468, filed Jun. 12, 2024, the entire contents of which is incorporated herein for all purposes by this reference.

BACKGROUND

Field of the Present Disclosure

The disclosure relates to a vehicle driving assistance control method and system that controls driving based on the influence of crosswinds and the position of other vehicles.

Description of Related Art

Various external environmental factors can influence vehicle driving. One such factor is crosswind, which blows from the side of the vehicle, generating lateral forces that can impair driving stability and, in severe cases, cause the vehicle to overturn.

To minimize the impact of crosswinds and enhance vehicle driving stability, various methods have been proposed to compensate for lateral forces and control vehicle behavior, such as electronic body control systems, vehicle stability control systems, and active suspension systems.

Recently, vehicles have been equipped with various sensors that can obtain information related to driving, such as distance sensors for detecting surrounding vehicles and image sensors for detecting the surrounding road environment. Additionally, utilizing these sensors, a variety of autonomous driving technologies have been developed to assist in maintaining or changing driving lanes and keeping a safety distance from surrounding vehicles.

Using these autonomous driving technologies, the disclosure proposes a method to avoid lateral forces caused by crosswinds, rather than solely relying on compensating for these forces acting on the vehicle.

The related art described above is intended merely to aid in the understanding of the background of the disclosure, and should not be construed as recognizing the prior art that is known to those skilled in the art.

SUMMARY

The disclosure aims to provide a vehicle driving assistance control method and system capable of mitigate the effects of crosswinds by controlling the vehicle's driving based on the influence of crosswinds and the position of other vehicles.

The technical objects of the disclosure are not limited to the aforesaid, and other objects not described herein with be clearly understood by those skilled in the art from the descriptions below.

In order to accomplish the above objects, a vehicle driving assistance control method according to an embodiment of the disclosure includes determining a crosswind force acting on a host vehicle in a direction crossing the direction of travel of the host vehicle based on the steering angle and acceleration of the host vehicle, and controlling, upon detecting at least one other vehicle within a predetermined distance from the host vehicle and the magnitude of the determined crosswind force being greater than a predetermined first threshold value, the driving of the host vehicle based on the direction of the determined crosswind force and the position of the at least one detected other vehicle.

For example, the controlling of the driving of the host vehicle may include controlling at least one of the steering and speed of the host vehicle to position the host vehicle on the side of the other vehicle along the crosswind force.

For example, the controlling of the driving of the host vehicle may include, after positioning the host vehicle alongside the detected other vehicle in the direction of the determined crosswind force, controlling the speed of the host vehicle to follow the speed of the detected other vehicle.

For example, the first threshold value may be set based on the weight of the host vehicle.

For example, the vehicle driving assistance control method may further include detecting a user setting signal permitting driving control of the host vehicle based on the magnitude of the crosswind force and the position of the other vehicle, wherein the controlling of the driving of the host vehicle may be performed upon detection of the user setting signal.

For example, the vehicle driving assistance control method may further include detecting a user operation signal for controlling the driving of the host vehicle, and terminating, upon detection of the user operation signal during the driving control of the host vehicle based on the direction of the crosswind and the position of the at least one other vehicle, the driving control of the host vehicle.

For example, the vehicle driving assistance control method may further include recognizing the road ahead of the host vehicle, determining the curvature of the recognized road, and terminating, upon detection of the determined curvature of the road ahead being smaller than a predetermined threshold curvature during the driving control of the host vehicle based on the direction of the crosswind force and the position of the other vehicle, the driving control of the host vehicle.

For example, the vehicle driving assistance control method may further include determining the presence or absence of a front vehicle in front of the host vehicle based on the position of the at least one detected other vehicle, recognizing the road environment in which the host vehicle is traveling, and determining the feasibility of lane changing for the host vehicle based on the road environment, wherein the controlling of the driving of the host vehicle may include controlling, based on the presence of the front vehicle, at least one of the steering and speed of the host vehicle to change lanes in the direction of the crosswind force, upon the crosswind force magnitude being larger than a predetermined second threshold value set to be greater than a predetermined first threshold value and the host vehicle being determined feasible of changing lanes in the direction of the crosswind force, allowing the host vehicle to be positioned alongside the front vehicle in the direction of the crosswind force.

For example, the controlling of the driving of the host vehicle may include controlling, based on the presence of the front vehicle, at least one of the steering and speed of the host vehicle, allowing the host vehicle to move within the current lane in the direction of the crosswind force to be positioned in the side-rear position relative to the front vehicle upon the magnitude of the crosswind force being less than the predetermined second threshold value or the host vehicle being determined infeasible of change lanes in the direction of the crosswind force.

For example, the controlling of the driving of the host vehicle may include, after the host vehicle being positioned in the side-rear position relative to the front vehicle, controlling the speed of the host vehicle to maintain a predetermined distance from the front vehicle and follow the speed of the front vehicle.

In order to accomplish the above objects, a vehicle driving assistance control system includes a sensor unit configured to detect steering angle and acceleration of a host vehicle and at least one other vehicle, and a control unit configured to determine a crosswind force acting on the host vehicle in a direction crossing the direction of travel of the host vehicle based on the steering angle and acceleration of the host vehicle, and controlling, upon detecting at least one other vehicle within a predetermined distance from the host vehicle and the magnitude of the determined crosswind force being greater than a predetermined first threshold value, the driving of the host vehicle based on the direction of the determined crosswind force and the position of the at least one detected other vehicle.

For example, the control unit may control at least one of the steering and speed of the host vehicle to position the host vehicle alongside the detected other vehicle.

For example, the control unit, after positioning the host vehicle alongside the detected other vehicle in the direction of the determined crosswind force, may control the speed of the host vehicle to follow the speed of the detected other vehicle.

For example, the first threshold value may be set based on the weight of the host vehicle.

For example, the sensor unit may detect a user setting signal permitting driving control of the host vehicle based on the magnitude of the crosswind force and the position of the other vehicle, and the control unit, upon detection of the user setting signal, may control the driving of the host vehicle based on the magnitude of the crosswind force and the position of the other vehicle.

For example, the sensor unit may detect a user operation signal for controlling the driving of the host vehicle, and the control unit, upon detection of the user operation signal during the driving control of the host vehicle based on the direction of the crosswind and the position of the at least one other vehicle, may terminate the driving control of the host vehicle.

For example, the sensor unit may recognize the road ahead of the host vehicle, and the control unit may determine the curvature of the recognized road and, upon detection of the determined curvature of the road ahead being smaller than a predetermined threshold curvature during the driving control of the host vehicle based on the direction of the crosswind force and the position of the other vehicle, terminate the driving control of the host vehicle.

For example, the sensor unit may recognize the road environment in which the host vehicle is traveling, and the control unit may determine the presence or absence of a front vehicle in front of the host vehicle based on the position of the at least one detected other vehicle, determine the feasibility of lane changing for the host vehicle based on the road environment, and control, based on the presence of the front vehicle, at least one of the steering and speed of the host vehicle to change lanes in the direction of the crosswind force, upon the crosswind force magnitude being larger than a predetermined second threshold value set to be greater than a predetermined first threshold value and the host vehicle being determined feasible of changing lanes in the direction of the crosswind force, allowing the host vehicle to be positioned alongside the front vehicle in the direction of the crosswind force.

For example, the control unit, based on the presence of the front vehicle, may control at least one of the steering and speed of the host vehicle, allowing the host vehicle to move within the current lane in the direction of the crosswind force to be positioned in the side-rear position relative to the front vehicle upon the magnitude of the crosswind force being less than the predetermined second threshold value or the host vehicle being determined infeasible of change lanes in the direction of the crosswind force.

For example, the control unit, after the host vehicle being positioned in the side-rear position relative to the front vehicle, may control the speed of the host vehicle to maintain a predetermined distance from the front vehicle and follow the speed of the front vehicle.

The various embodiments of the disclosure are advantageous in terms of reducing the steering burden on the driver and improving driving stability by mitigating the effects of crosswinds using surrounding vehicles.

Furthermore, by avoiding the lateral forces caused by crosswinds themselves rather than compensating for the vehicle's behavior caused by these forces, it becomes possible to enhance driving stability even in situations with strong crosswinds.

The advantages of the disclosure are not limited to the aforesaid, and other advantages not described herein may be clearly understood by those skilled in the art from the descriptions below.

DETAILED DESCRIPTION

In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

The singular forms are intended to include the plural forms as well unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

As used in the following description, the suffix “module” and “unit” are granted or used interchangeably in consideration of easiness of description but, by itself, having no distinct meaning or role.

It will be understood that when a component is referred to as being “connected to” or “coupled to” another component, it can be directly connected or coupled to the other component or intervening component may be present. In contrast, when a component is referred to as being “directly connected to” or “directly coupled to” another component, there are no intervening component present.

In addition, it should be noted that the terms “unit” or “control unit” found in the names of vehicle control units or similar devices are typically used to describe controllers responsible for specific functions of a vehicle, rather than indicating a generic function unit.

Hereinafter, descriptions are made of the embodiments disclosed in the present specification with reference to the accompanying drawings in which the same reference numbers are assigned to refer to the same or like components and redundant description thereof is omitted.

Figure 1:
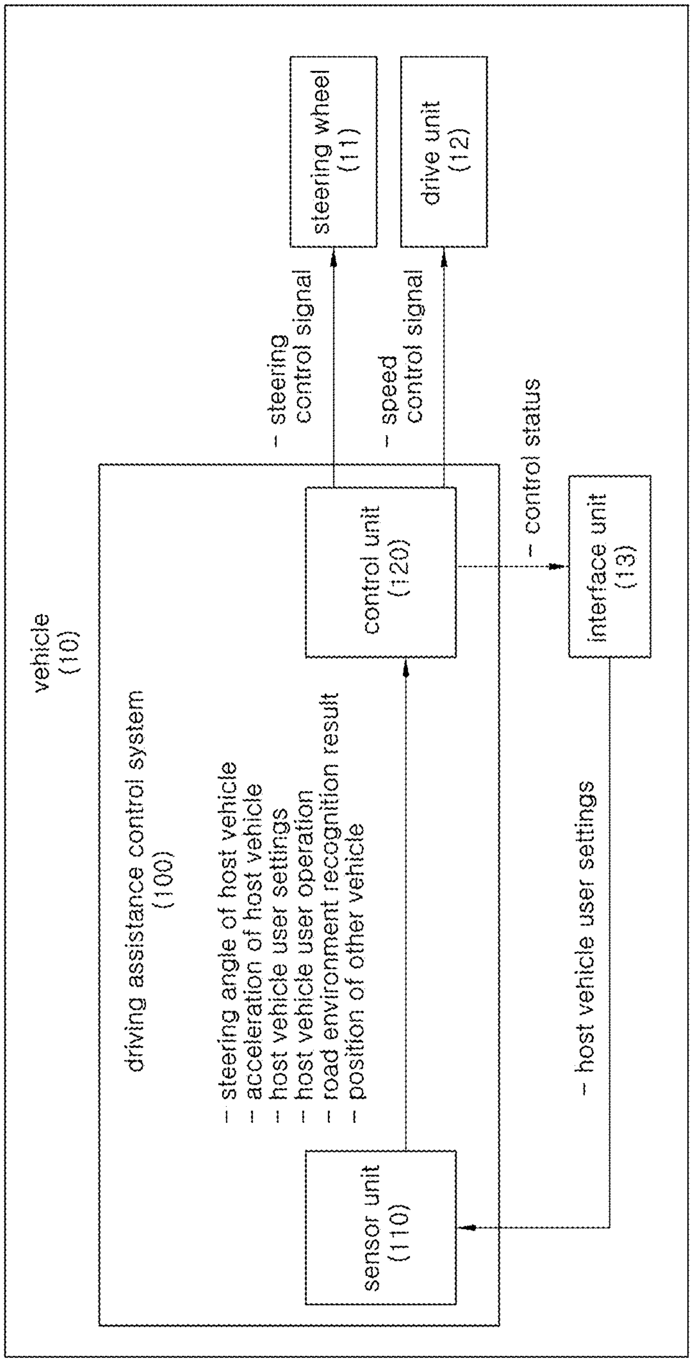
FIG. 1 is a diagram illustrating the configuration of a vehicle driving assistance control system according to an embodiment of the disclosure.

Before explaining the vehicle driving assistance control method according to an embodiment of the disclosure, the vehicle driving assistance control system is described first with reference to FIG. 1.

FIG. 1 is a diagram illustrating the configuration of a vehicle driving assistance control system according to an embodiment of the disclosure.

With reference to FIG. 1, the vehicle driving assistance control system 100 according to an embodiment of the disclosure may include a sensor unit 110 and a control unit 120 and may be equipped on a vehicle 10. In addition to the vehicle driving assistance control system 100, the vehicle 10 may include a steering wheel 11 for steering the vehicle, a drive unit 12 for driving the vehicle, and an interface unit 13 for interaction with the user.

Here, the drive unit 12 may include at least one of an engine and a motor, and the detailed configuration may vary depending on the type of vehicle 10. In addition, the interface unit 13 may be implemented, for example, within the vehicle 10 as a cluster, Audio, Video, Navigation, and Telematics (AVNT), head-up display (HUD), or may be implemented separately as a user terminal device, apart from the vehicle 10.

It should be noted that FIG. 1 primarily shows the components essential to the description of an embodiment of the disclosure, and the actual system may be implemented with more or fewer components. Hereinafter, each component will be described in detail.

In the following description, “host vehicle” refers to the vehicle 10 equipped with the driving assistance control system 100, and “other vehicle” refers to vehicles other than the currently controlled vehicle 10.

First, the sensor unit 110 may include a plurality of sensors installed in the host vehicle 10. For example, the sensor unit 110 may include a steering wheel sensor for detecting the steering angle, an accelerometer for detecting acceleration, and a distance sensor for detecting surrounding vehicles.

Additionally, the sensor unit 110 may detect user setting signals that allow the control unit 120 to perform driving control and user operation signals that control the driving of the host vehicle 10. User setting signals may be generated, for example, by user inputs through operation buttons provided on the interface unit 13. User operation signals may include acceleration control signals, braking control signals, and steering control signals, which may be detected through an accelerator pedal sensor, a brake pedal sensor, and a steering wheel sensor.

In addition, the sensor unit 110 may include image sensors such as cameras and distance sensors, allowing the host vehicle 10 to recognize the road environment while driving. Here, the road environment may include the shape of the road ahead of the host vehicle 10, lanes, lane markings, and the positions of other vehicles and objects present on the road.

The control unit 120 may determine the crosswind force based on the steering angle and acceleration of the host vehicle 10 detected through the sensor unit 110. Here, the crosswind force refers to the force acting in a direction perpendicular to the driving direction of the host vehicle 10, which means the force exerted sideways on the host vehicle 10 due to crosswind.

For example, the control unit 120 may compare the lateral components of the steering angle and acceleration to determine that a crosswind force is present when lateral acceleration occurs despite a fixed steering angle of the host vehicle 10, and determine the magnitude and direction of the crosswind based on the lateral component of the acceleration relative to the steering angle.

The control unit 120 may control the driving of the host vehicle 10 based on the direction of the crosswind force and the position of at least one other vehicle when at least one other vehicle is detected within a predetermined range and the determined crosswind force exceeds a preset first threshold value.

Here, the predetermined range is the distance within which the sensor unit 110, using image sensors, distance sensors, etc., can detect other vehicles, and this value may vary depending on the configuration and specifications of the sensor unit 110. In addition, a first threshold value, as a criterion for determining the presence or absence of a crosswind force, be set based on the weight of the vehicle 10, for example. That is, when the influence of crosswinds is expected, the control unit 120 may control the driving of the host vehicle 10 based on the direction of the crosswind force and the position of other vehicles.

In more detail, the control unit 120 may control at least one of the steering and speed of the host vehicle 10 to position the host vehicle 10 on one side of another vehicle along the direction of the crosswind force. This allows the host vehicle 10 to use other vehicles as a shield against the crosswind, thereby avoiding the crosswind and mitigating the effects of the lateral forces.

After positioning the vehicle 10 on one side of the other vehicle along the direction of the crosswind, the control unit 120 may control the speed of the host vehicle to follow the speed of the other vehicle. For this purpose, the control unit 120 continuously assesses the speed of the other vehicle based on its position and may perform smart cruise control to maintain the speed of the host vehicle at the same level as the speed of the other vehicle.

To achieve this, the control unit 120 may transmit steering control signals and speed control signals to the steering wheel 11 and the drive unit 12 of the host vehicle 10, respectively, allowing the host vehicle 10 to be controlled by the steering wheel 11 and drive unit 12 operating based on the received control signals.

Meanwhile, the control unit 120 may intervene in the driving of the host vehicle 10 when a user setting signal is detected that allows driving intervention of driving assistance control, i.e., driving control of the host vehicle 10 based on the magnitude of the crosswind force and the position of other vehicles. When no user setting signal is detected, meaning the user does not desire intervention from the control unit 120, the control unit 120 may refrain from controlling the driving of the host vehicle 10, regardless of the magnitude of the crosswind or the position of other vehicles. This allows for driving control to be performed reflecting the intentions of the driver or user of the host vehicle.

In addition, when detecting a user operation signal that controls the driving of the host vehicle 10 while controlling the driving of the host vehicle 10 as described above, the control unit 120 may terminate the driving control of the host vehicle based on the direction of the crosswind force and the position of at least one other vehicle. That is, when the driver of the host vehicle 10 or another user directly operates the host vehicle 10 by steering the steering wheel or operating the accelerator/brake pedal, while driving assistance control is being performed, the control unit 120 returns the control authority for driving the host vehicle 10 to the user, thereby reflecting the user's intention in the driving control.

Furthermore, the control unit 120 may determine the curvature of the forward road recognized through the sensor unit 110, and during the driving control of the host vehicle, when the determined curvature of the forward road is below a predefined threshold curvature, the driving control of the host vehicle based on the direction of the crosswind force and the position of other vehicles may be terminated.

Here, the threshold curvature is set to predict whether the lateral force caused by the crosswind is resolved or not, allowing the release of driving assistance control to mitigate the effect of the lateral force, considering the possibility of alleviating the lateral force when the host vehicle's travel direction changes. For example, when the host vehicle 10 traveling northward with an east wind blowing needs to turn west due to a curved road ahead, the lateral force caused by the east wind will act in the same direction as the new westward direction, so when such a change in direction is anticipated, the control unit 120 may release the driving control. In this case, the predetermined threshold curvature may be, for example, 150°.

The control unit 120 may determine whether a lane change is feasible for the host vehicle 10 based on the road environment recognized through the sensor unit 110. Based on the determination of the feasibility of lane change, the control unit 120 may perform lane keeping assistance control to maintain the current lane of the host vehicle 10 or lane change assistance control to facilitate the host vehicle 10 moving to another lane.

The determination of the feasibility of lane change may consider factors such as the lanes, lane markings, and the positions of other vehicles in the recognized road environment. In more detail, the control unit 120 may assess the lane the host vehicle 10 is currently traveling in and the lane the host vehicle 10 intends to change to based on lane markings and may determine feasibility of a lane change based on whether there are lanes adjacent to the one the host vehicle 10 is currently in and whether there are other vehicles present in the lane to change to.

Meanwhile, the control unit 120 may transmit the current driving control status to the interface unit 13, and upon receiving this information, the interface unit 13 may output the driving control status of the host vehicle 10 to the user in a visual, auditory, or other manner, allowing the user to be aware of the driving control status of the control unit 120. For example, the interface unit 13 may be implemented as a cluster, and the display screen of the cluster may show indications such as "Crosswind Assistance Mode Activated" to indicate that the control unit 120 is performing driving control.

To execute the above-described operations, the control unit 120 may be implemented as a controller equipped in the host vehicle 10, for example, a vehicle control unit. In this case, the controller such as the vehicle control unit may include a communication device for communicating with other controllers or sensors for controlling the functions it is responsible for, a memory for storing operating systems, logic instructions, and input/output information, and one or more processors for performing judgments, computations, and decisions necessary for controlling the functions it is responsible for.

Hereinafter, a description is made of the control method based on the position of other vehicles with reference to FIGS. 2 to 5.

Figure 2:
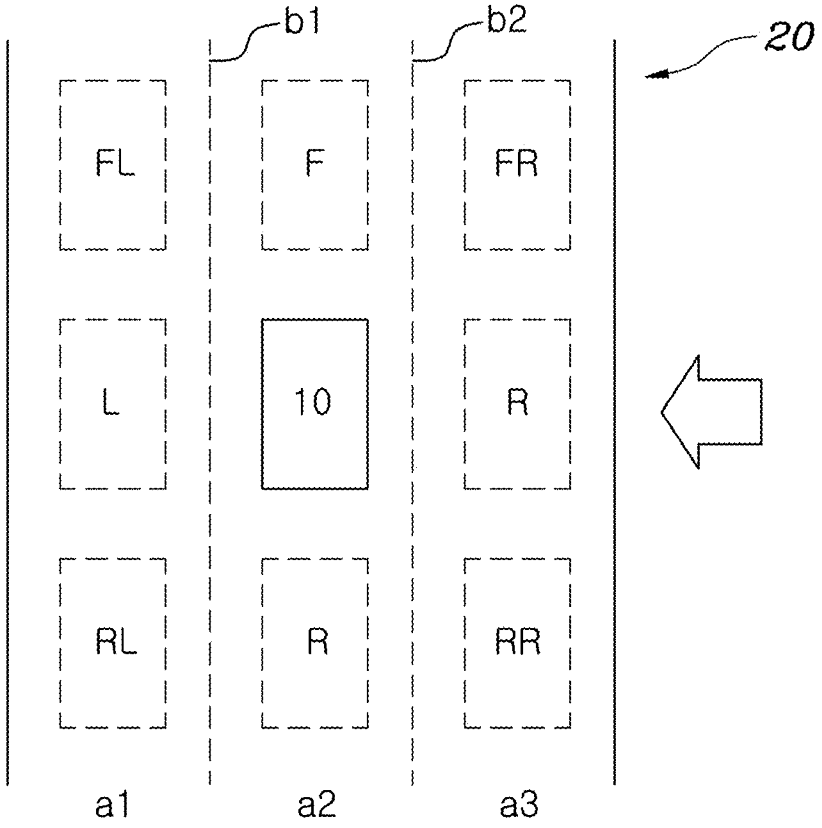
FIG. 2 is a diagram illustrating the mechanism of vehicle driving assistance control according to an embodiment of the disclosure.

FIG. 2 is a diagram illustrating the mechanism of vehicle driving assistance control according to an embodiment of the disclosure.

FIG. 2 illustrates an example of a road 20 with three lanes a1, a2, and a3 and two lane markings b1 and b2, with the host vehicle 10 assumed to be traveling in the center of the road 20.

The control unit 120 may control the driving of the host vehicle 10 based on the direction of the crosswind force (leftward in FIG. 2) and the position of other vehicles. In FIG. 2, the driving behavior of host vehicle 10 is described based on the positions of other vehicles, assuming a constant crosswind direction.

First, when another vehicle is located in the front position F of the host vehicle 10 on the road 20, the control unit 120 may control the steering and speed of the host vehicle 10 traveling in the second lane a2 to change lanes to the first lane a1 and position the host vehicle 10 in the laterally adjacent position FL to the other vehicle in the first lane a1.

Alternatively, when another vehicle is located in the front-right position FR relative to the host vehicle 10 on the road 20, the control unit 120 may control the speed of the host vehicle 10 traveling in the second lane a2 to accelerate and position the host vehicle 10 in the laterally adjacent position F to the other vehicle.

Alternatively, when another vehicle is located in the right position R relative to the host vehicle 10 on the road 20, the control unit 120 may not perform any additional driving control since the host vehicle 10 is already traveling in the desired position relative to the other vehicle. However, depending on the situation, the control unit 120 may control the speed of the host vehicle 10 in lane a2 to maintain its current relative position with the other vehicle.

Alternatively, when another vehicle is located in the rear-right position RR relative to the host vehicle 10 on the road 20, the control unit 120 may decelerate the host vehicle 10 traveling in the second lane a2 to position the host vehicle 10 in the laterally adjacent position R to the other vehicle.

Alternatively, when another vehicle is located in the rear position R relative to the host vehicle 10 on the road 20, the control unit 120 may control the host vehicle 10 traveling in the second lane a2 to change lanes to the first lane a1 and position the host vehicle 10 in the laterally adjacent position RL to the other vehicle.

However, when another vehicle is located in the front-left position FL, left position L, or rear-left position RL position relative to the host vehicle 10, and there is no lane to the left of the first lane a1, the host vehicle 10 cannot be positioned laterally adjacent to the other vehicle to avoid the crosswind force. In this case, the control unit 120 may control the host vehicle 10 to travel behind and laterally offset from the other vehicle 10, rather than positioning the host vehicle 10 laterally adjacent to the other vehicle for crosswind protection.

In the following, a description is provided of an example for the case where another vehicle is located in front of the host vehicle in the same lane, with reference to FIGS. 3 to 5.

Figure 3:
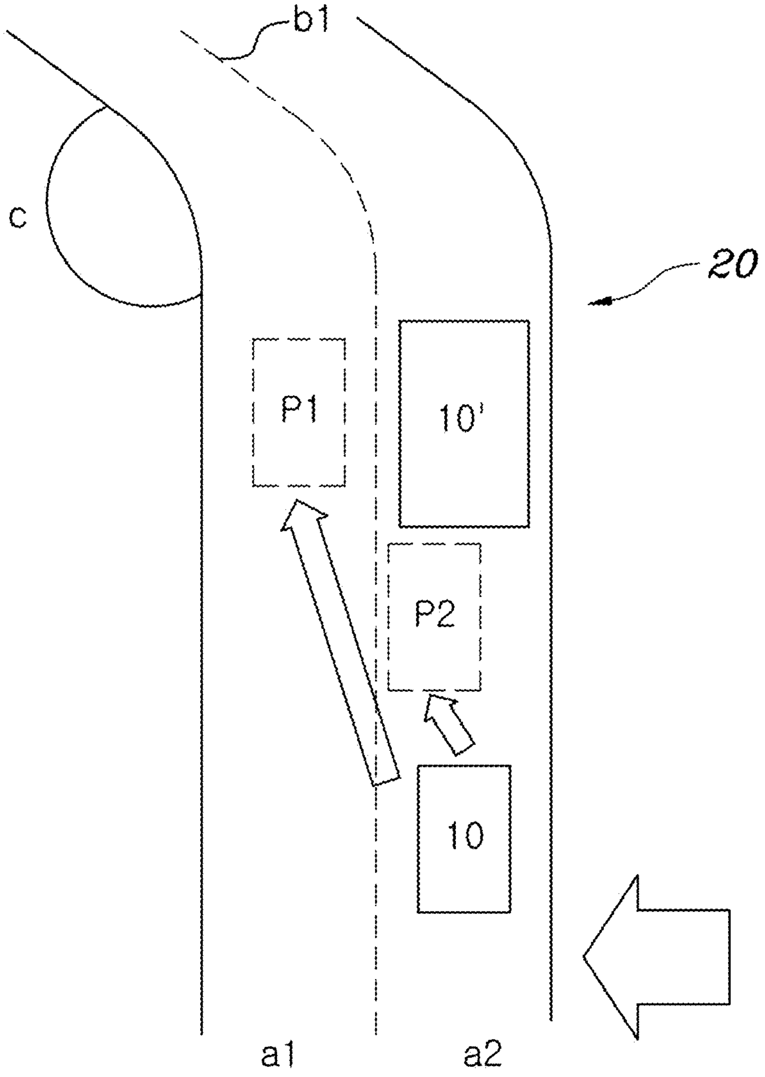
FIGS. 3, 4, and 5 are diagrams illustrating the mechanism of vehicle driving assistance control according to an embodiment of the disclosure.
Figure 4:
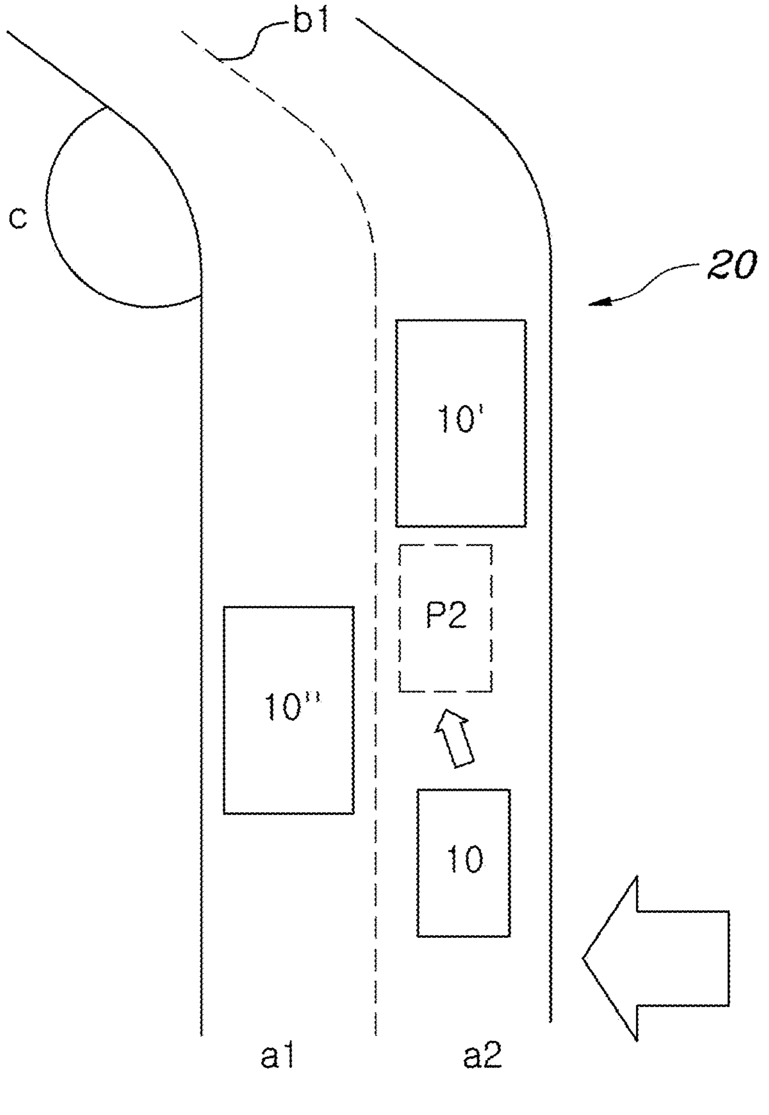
Figure 5:
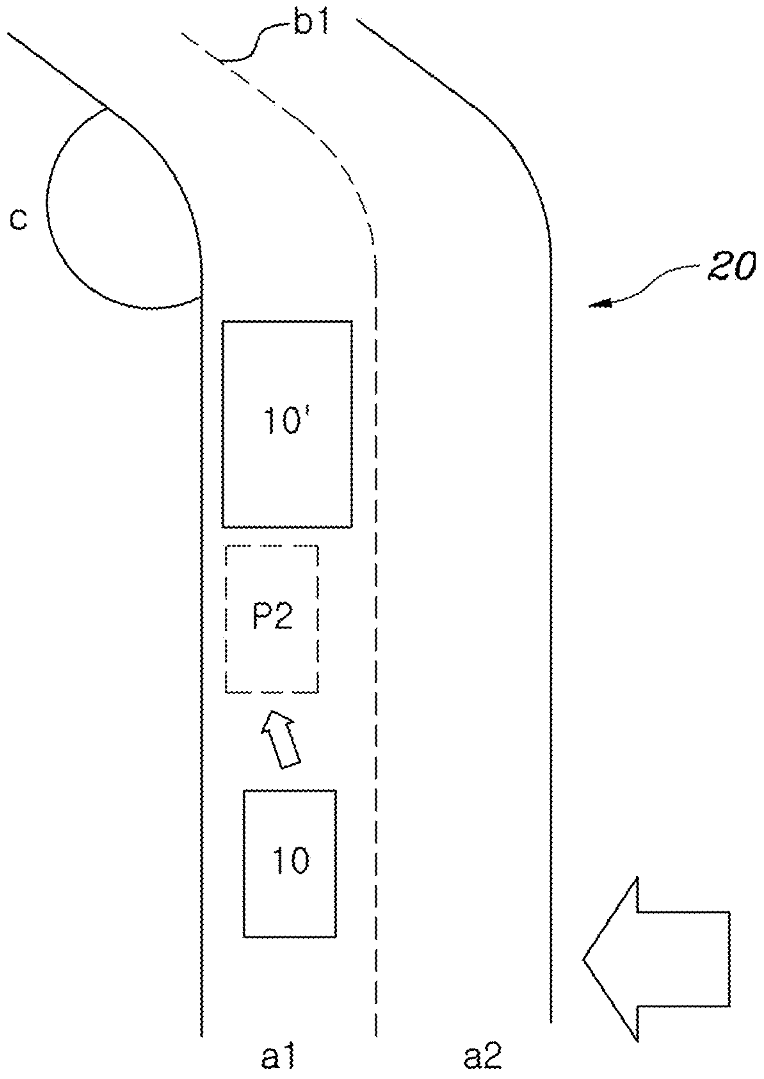

FIGS. 3 to 5 are diagrams illustrating the mechanism of vehicle driving assistance control according to an embodiment of the disclosure.

FIG. 3 shows an exemplary situation where both the host vehicle 10 and the front vehicle 10' are traveling in the second lane a2 on the road 20, and the first lane a1 is present to the left of the second lane a2.

The control unit 120 may determine the presence or absence of the front vehicle 10' based on the position of another vehicle detected within a predetermined distance. In this case, the front vehicle 10' may refer to any other vehicle located within a predetermined range in front of the host vehicle 10.

When the front vehicle 10' is present and the magnitude of the detected crosswind force exceeds a predetermined second threshold, the control unit 120 may determine that the host vehicle 10 can change lanes in the direction of the crosswind (from a2 to a1), and thus control the steering and speed of the host vehicle 10 to change lanes in the direction of the crosswind (from a2 to a1) and position the host vehicle 10 laterally adjacent to one side (P1) of the front vehicle 10'. Here, the second threshold is set to have a value larger than the first threshold, which is used to determine the presence or absence of crosswind force, and may be utilized as a criterion for determining the presence or absence of strong wind. For example, the second threshold value may be twice the value of the first threshold.

In this case, the control unit 120 may perform smart cruise control to ensure that the host vehicle 10 maintains its relative position alongside the front vehicle 10' by adjusting the speed of the host vehicle 10 to follow the speed of the front vehicle 10'. Furthermore, the control unit 120 may perform lane-keeping control to keep the host vehicle 10 positioned slightly offset towards the lane marking b1 between the second lane a2 and the first lane a1, instead of driving in the center of the newly changed lane, the first lane a1.

On the other hand, when the assessed magnitude of the crosswind force is below the predetermined second threshold value, the control unit 120 may control the host vehicle 10 to travel in the side-rear position P2 of the front vehicle 10' instead of positioning the host vehicle 10 in the laterally adjacent position P1 to the front vehicle 10' by changing lanes (from a2 to a1) in the direction of the crosswind force. Here, the side-rear position P2 of the front vehicle 10' may refer to a position slightly offset towards the lane marking b1 in the direction of the crosswind force among the rear of the front vehicle 10'.

When the magnitude of the crosswind force is below the predetermined second threshold value, priority may be given to maintaining the current driving state over avoiding the crosswind force, allowing the control unit 120 to perform driving assistance control within the current lane a2 without changing lanes. In this case, while the host vehicle 10 may not be entirely shielded from the crosswind by the front vehicle 10', the position relationship with the front vehicle 10' allows for partial mitigation of the crosswind's influence.

Additionally, the control unit 120 may terminate driving control for the host vehicle 10 when the curvature c of the road ahead, as recognized through the sensor unit 110 while the host vehicle 10 is traveling in the lateral position P1 or side-rear position P2 relative to the front vehicle 10', is below a predetermined threshold curvature. When driving control is terminated, the interface unit 13 may display to the user of the host vehicle 10 that control has ended, and thereafter, the driving of the host vehicle 10 may be controlled by the user.

Next, FIG. 4 shows an exemplary situation where both the host vehicle 10 and the front vehicle 10' are traveling in the second lane a2 of the road 20 and another vehicle 10" is traveling in the first lane a1, positioned to the left of the second lane a2, laterally relative to the front vehicle 10'.

In this case, due to the presence of another vehicle 10", the host vehicle 10 cannot change lanes (from a2 to a1) in the direction of the crosswind force, so the control unit 120 may control the steering and speed of the host vehicle 10 to move within the current lane a2 in the direction of the crosswind force, positioning the host vehicle 10 in the side-rear position P2 relative to the front vehicle 10'.

That is, even though the magnitude of the crosswind force exceeds the predetermined second threshold value, when the host vehicle 10 cannot change lanes (from a2 to a1) in the direction of the crosswind force, the control unit 120 may perform driving assistance control within the current lane a2 where the host vehicle 10 is traveling, without changing lanes. In this scenario, while the host vehicle 10 may not be entirely shielded from the crosswind by the other vehicle 10', the relative positioning with the front vehicle 10' allows for partial mitigation of the effects of the crosswind.

After the host vehicle 10 is positioned in the side-rear position P2 of the front vehicle 10', the control unit 120 may control the speed of the host vehicle to maintain a predetermined distance from the front vehicle 10' and to follow the speed of the front vehicle 10'. In this case, the predetermined distance may vary according to user settings but may represent the minimum configurable distance, for example, corresponding to the distance set in configurations where the distance between the front vehicle and the host vehicle is minimized, such as in settings for maintaining inter-vehicle distance through smart cruise control functionality.

Next, FIG. 5 shows an exemplary situation where both the host vehicle 10 and the front vehicle 10' are traveling in the first lane a1 of the road 20 with no other lanes to the left of the first lane a1.

In this case, due to the road structure, the host vehicle 10 cannot change lanes (from a1 to left) in the direction of the crosswind force, so the control unit 120 may control the steer and speed of the host vehicle 10 to move within the current lane a1 in the direction of the crosswind force, positioning the host vehicle 10 in the side-rear position P2 relative to the front vehicle 10'.

That is, even though the magnitude of the crosswind force exceeds the predetermined second threshold value, when the host vehicle 10 cannot change lanes (from a1 to left) in the direction of the crosswind force, the control unit 120 may perform driving assistance control within the current lane a1 where the host vehicle 10 is traveling, without changing lanes. In this scenario, while the host vehicle 10 may not be entirely shielded from the crosswind by the other vehicle 10', the relative positioning with the front vehicle 10' allows for partial mitigation of the effects of the crosswind.

After the host vehicle 10 is positioned in the side-rear position P2 relative to the front vehicle 10', the control unit 120 may control the speed of the host vehicle 10 to maintain a predetermined distance from the front vehicle 10' and to follow the speed of the front vehicle 10'. In this case, the predetermined distance may vary according to user settings but may represent the minimum configurable distance, for example, corresponding to the distance set in configurations where the distance between the front vehicle and the host vehicle is minimized, such as in settings for maintaining inter-vehicle distance through smart cruise control functionality.

Hereinafter, the above description is elaborated with reference to a flowchart.

Figure 6:
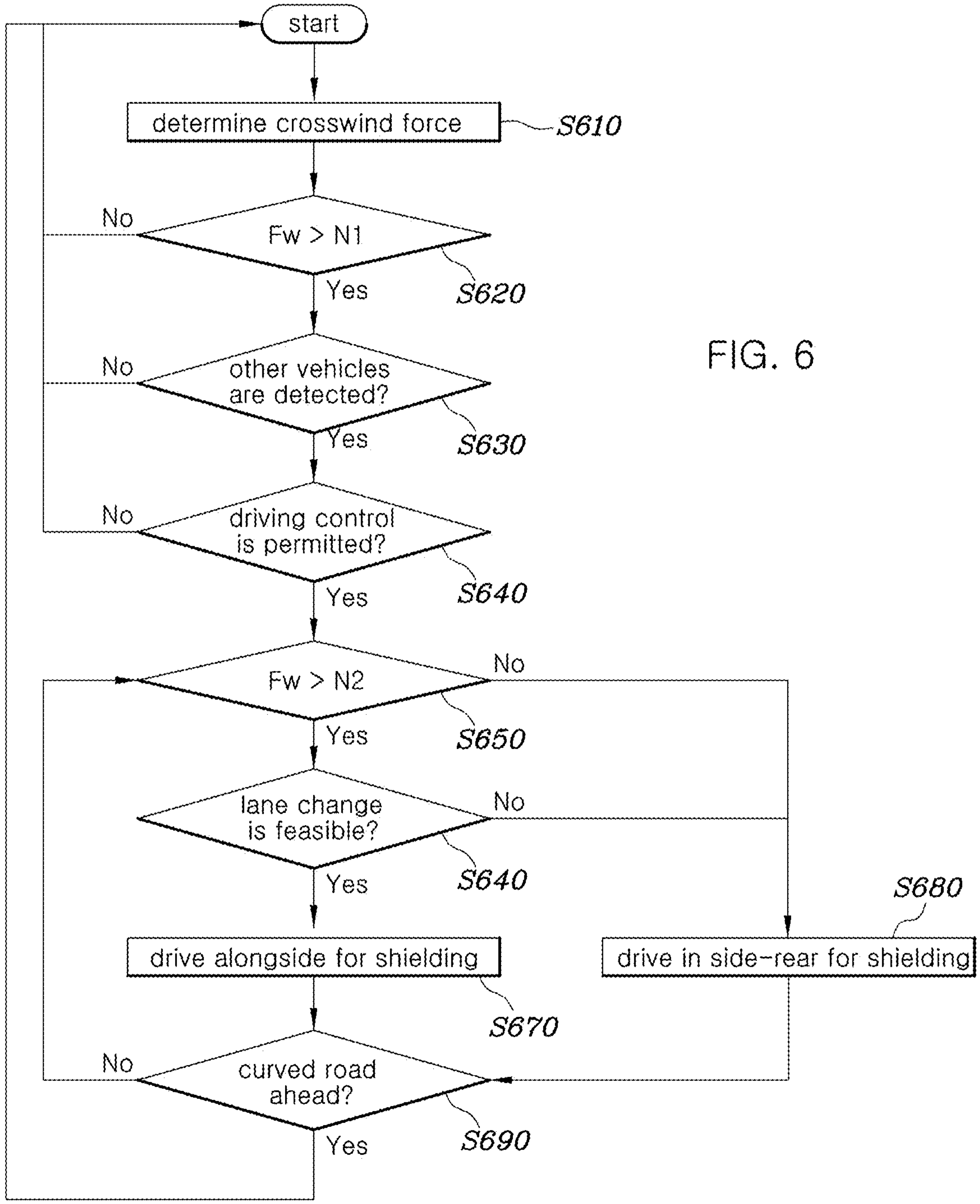
FIG. 6 is a flowchart illustrating a vehicle driving assistance control method according to an embodiment of the disclosure.

FIG. 6 is a flowchart illustrating a vehicle driving assistance control method according to an embodiment of the disclosure.

With reference to FIG. 4, the control unit may assess the crosswind based on the steering angle and acceleration of the host vehicle in operation S610, and when the assessed crosswind force Fw exceeds the first threshold value N1 (Yes in operation S620), may detect other vehicles through distance sensors in the sensor unit 110 in operation S630.

When other vehicles are detected (Yes in operation S630), the control unit may verify the permission for driving control through user settings signals (in operation S640), and when driving control is permitted (Yes in operation S640), may control the operation of the host vehicle based on the magnitude of the crosswind force and the lane change feasibility.

In more detail, when the magnitude of the crosswind force Fw exceeds the predetermined second threshold value N2 (Yes in operation S650), and it is determined that the host vehicle can change lanes in the direction of the crosswind force (Yes in operation S660), the control unit (120) may control the operation of the host vehicle to travel behind and be shielded from the crosswind by the other vehicle in operation S670 after changing lanes in the direction of the crosswind force.

On the other hand, when the magnitude of the crosswind force Fw is below the predetermined second threshold value N2 (No in operation S650), or when it is determined that the host vehicle cannot change lanes in the direction of the crosswind force (No in operation S660), the control unit may control the operation of the host vehicle to maintain the current lane and partially shield from the crosswind behind the other vehicle in operation S680.

Meanwhile, during the control of the host vehicle, when the curvature of the road ahead is determined to be below the predetermined threshold curvature (Yes in operation S690), the control unit 120 may predict the resolution of the crosswind force and release the driving control of the host vehicle.

As described above, the various embodiments of the disclosure are advantageous in terms of reducing the steering burden on the driver and improving driving stability by mitigating the effects of crosswinds using surrounding vehicles.

Furthermore, by avoiding the lateral forces caused by crosswinds themselves rather than compensating for the vehicle's behavior caused by these forces, it becomes possible to enhance driving stability even in situations with strong crosswinds.

Although the disclosure has been illustrated and described in connection with specific embodiments, it will be obvious to those skilled in the art that various modification and changes can be made thereto without departing from the spirit of the disclosure or the scope of the appended claims.

The invention claimed is:

1. A vehicle driving assistance control method comprising:

determining, by a control unit, a crosswind force acting on a host vehicle in a direction crossing the direction of travel of the host vehicle based on a steering angle and acceleration of the host vehicle; and controlling, by the control unit, upon detecting at least one other vehicle within a predetermined distance from the host vehicle and a magnitude of the determined crosswind force being greater than a predetermined first threshold value, the driving of the host vehicle based on the direction of the determined crosswind force and the position of the at least one other detected vehicle.

2. The vehicle driving assistance control method of claim 1, wherein controlling driving of the host vehicle comprises controlling at least one of steering and speed of the host vehicle to position the host vehicle on a side of the at least one other detected vehicle along the direction of the determined crosswind force.

3. The vehicle driving assistance control method of claim 2, wherein controlling driving of the host vehicle comprises, after positioning the host vehicle on the side of the at least one other detected vehicle in the direction of the determined crosswind force, controlling the speed of the host vehicle to follow a speed of the at least one other detected vehicle.

4. The vehicle driving assistance control method of claim 1, wherein the predetermined first threshold value is set based on a weight of the host vehicle.

5. The vehicle driving assistance control method of claim 1, further comprising detecting a user setting signal permitting driving control of the host vehicle based on the magnitude of the determined crosswind force and the position of the at least one other detected vehicle, wherein controlling the driving of the host vehicle is performed upon detection of the user setting signal.

6. The vehicle driving assistance control method of claim 1, further comprising:

detecting a user operation signal for controlling the driving of the host vehicle; and terminating, upon detection of the user operation signal during driving control of the host vehicle based on the direction of crosswind and the position of the at least one other detected vehicle, the driving control of the host vehicle.

7. The vehicle driving assistance control method of claim 1, further comprising:

recognizing a road ahead of the host vehicle;

determining a curvature of the recognized road; and terminating, upon detection of the determined curvature of the road ahead being smaller than a predetermined threshold curvature during driving control of the host vehicle based on the direction of the determined crosswind force and the position of the at least one other detected vehicle, the driving control of the host vehicle.

8. The vehicle driving assistance control method of claim 1, further comprising:

determining a presence or absence of a front vehicle in front of the host vehicle based on the position of the at least one other detected vehicle;

recognizing a road environment in which the host vehicle is traveling; and determining feasibility of lane changing for the host vehicle based on the road environment;

wherein controlling the driving of the host vehicle comprises controlling, upon the front vehicle being determined to be present, the magnitude of the determined crosswind force being larger than a predetermined second threshold value set to be greater than the predetermined first threshold value and the host vehicle being determined feasible of changing lanes in the direction of the determined crosswind force, at least one of steering and speed of the host vehicle to enable the host vehicle to change lanes in the direction of the determined crosswind force and to position the host vehicle on a side of the front vehicle in the direction of the determined crosswind force.

9. The vehicle driving assistance control method of claim 8, wherein controlling the driving of the host vehicle comprises controlling, upon the front vehicle being determined to be present and the magnitude of the determined crosswind force being less than the predetermined second threshold value or the host vehicle being determined infeasible of change lanes in the direction of the determined crosswind force, at least one of the steering and the speed of the host vehicle to move the host vehicle within a current lane in the direction of the determined crosswind force and to position the host vehicle in a side-rear position relative to the front vehicle.

10. The vehicle driving assistance control method of claim 9, wherein controlling the driving of the host vehicle comprises, after the host vehicle is positioned in the side-rear position relative to the front vehicle, controlling the speed of the host vehicle to maintain a predetermined distance from the front vehicle and to follow the speed of the front vehicle.

11. A vehicle driving assistance control system comprising:

a sensor unit configured to detect steering angle and acceleration of a host vehicle and to detect at least one other vehicle; and a control unit configured to determine a crosswind force acting on the host vehicle in a direction crossing the direction of travel of the host vehicle based on the steering angle and acceleration of the host vehicle, and to control, upon detecting at least one other vehicle within a predetermined distance from the host vehicle and a magnitude of the determined crosswind force being greater than a predetermined first threshold value, the driving of the host vehicle based on the direction of the determined crosswind force and a position of the at least one other detected vehicle.

12. The vehicle driving assistance control system of claim 11, wherein the control unit is configured to control at least one of steering and speed of the host vehicle to position the host vehicle on a side of the at least one other detected vehicle along the direction of the determined crosswind force.

13. The vehicle driving assistance control system of claim 12, wherein the control unit, after positioning the host vehicle on the side of the at least one other detected vehicle in the direction of the determined crosswind force, is configured to control the speed of the host vehicle to follow a speed of the at least one other detected vehicle.

14. The vehicle driving assistance control system of claim 11, wherein the predetermined first threshold value is set based on a weight of the host vehicle.

15. The vehicle driving assistance control system of claim 11, wherein the sensor unit is configured to detect a user setting signal permitting driving control of the host vehicle based on the magnitude of the determined crosswind force and the position of the at least one other detected vehicle, and the control unit, upon detection of the user setting signal, is configured to control the driving of the host vehicle based on the magnitude of the determined crosswind force and the position of the at least one other detected vehicle.

16. The vehicle driving assistance control system of claim 11, wherein the sensor unit is configured to detect a user operation signal for controlling the driving of the host vehicle, and the control unit, upon detection of the user operation signal during driving control of the host vehicle based on the direction of the determined crosswind and the position of the at least one other detected vehicle, terminates the driving control of the host vehicle.

17. The vehicle driving assistance control system of claim 11, wherein the sensor unit is configured to recognize a road ahead of the host vehicle, and the control unit is configured to determine a curvature of the recognized road and, upon detection of the determined curvature of the road ahead being smaller than a predetermined threshold curvature during driving control of the host vehicle based on the direction of the determined crosswind force and the position of the at least one other detected vehicle, is configured to terminate the driving control of the host vehicle.

18. The vehicle driving assistance control system of claim 11, wherein the sensor unit is configured to recognize a road environment in which the host vehicle is traveling, and the control unit is configured to:

determine a presence or absence of a front vehicle in front of the host vehicle based on the position of the at least one other detected vehicle;

determine feasibility of lane changing for the host vehicle based on the road environment; and control, upon the front vehicle being determined to be present, the magnitude of the determined crosswind force being larger than a predetermined second threshold value set to be greater than the first threshold value, and the host vehicle being determined feasible of changing lanes in the direction of the determined crosswind force, at least one of steering and speed of the host vehicle so that the host vehicle is able to change lanes in the direction of the determined crosswind force, and to be positioned on a side of the front vehicle in the direction of the determined crosswind force.

19. The vehicle driving assistance control system of claim 18, wherein the control unit is configured to control, upon the front vehicle being determined to be present and the magnitude of the determined crosswind force being less than the predetermined second threshold value or the host vehicle being determined infeasible of change lanes in the direction of the determined crosswind force, at least one of the steering and speed of the host vehicle so that the host vehicle is able to move within a current lane in the direction of the determined crosswind force, and to be positioned in a side-rear position relative to the front vehicle.

20. The vehicle driving assistance control system of claim 19, wherein the control unit, after the host vehicle is positioned in the side-rear position relative to the front vehicle, is configured to control the speed of the host vehicle to maintain a predetermined distance from the front vehicle and follow a speed of the front vehicle.

* * * * *